(12) United States Patent
Kakegawa

(10) Patent No.: US 9,126,860 B2
(45) Date of Patent: Sep. 8, 2015

(54) OPTICAL MEMBER AND METHOD FOR MAKING THE SAME

(75) Inventor: Norishige Kakegawa, Chofu (JP)

(73) Assignee: Canon Kabushiki Kaisha, Tokyo (JP)

( * ) Notice: Subject to any disclaimer, the term of this patent is extended or adjusted under 35 U.S.C. 154(b) by 549 days.

(21) Appl. No.: 13/503,162

(22) PCT Filed: Oct. 19, 2010

(86) PCT No.: PCT/JP2010/006182
§ 371 (c)(1),
(2), (4) Date: Apr. 20, 2012

(87) PCT Pub. No.: WO2011/048794
PCT Pub. Date: Apr. 28, 2011

(65) Prior Publication Data
US 2012/0212827 A1  Aug. 23, 2012

(30) Foreign Application Priority Data
Oct. 23, 2009  (JP) .................................. 2009-244832

(51) Int. Cl.
G02B 27/00 (2006.01)
C03C 17/34 (2006.01)
C03C 1/00 (2006.01)
G02B 1/115 (2015.01)
G02B 1/118 (2015.01)

(52) U.S. Cl.
CPC ............. *C03C 17/3417* (2013.01); *C03C 1/008* (2013.01); *G02B 1/115* (2013.01); *G02B 1/118* (2013.01); *C03C 2217/425* (2013.01); *C03C 2217/465* (2013.01); *C03C 2217/73* (2013.01); *C03C 2217/77* (2013.01)

(58) Field of Classification Search
None
See application file for complete search history.

(56) References Cited

U.S. PATENT DOCUMENTS
5,948,481 A * 9/1999 Yan et al. .................. 427/419.3
2008/0310026 A1  12/2008 Nakayama

FOREIGN PATENT DOCUMENTS

| | | |
|---|---|---|
| EP | 1574881 A1 | 9/2005 |
| EP | 1693689 A1 | 8/2006 |
| EP | 1947486 A2 | 7/2008 |
| EP | 2000289 A1 | 12/2008 |
| EP | 2236462 A2 | 10/2010 |
| EP | 2237078 A2 | 10/2010 |
| JP | 9-202649 A | 8/1997 |
| JP | 4247354 B2 | 4/2009 |

OTHER PUBLICATIONS

Moisture induced crack filling in barrier coatings containing montmorillonite as an expandable phaseMicciche et al Surface and Coatings Technology, vol. 202, No. 14, Dec. 15, 2007, pp. 3346-3353.

* cited by examiner

*Primary Examiner* — Derek S Chapel
(74) *Attorney, Agent, or Firm* — Canon USA Inc. IP Division

(57) ABSTRACT

An optical member includes a glass substrate and an antireflection film disposed on a surface of the glass substrate. The antireflection film includes an oxide layer mainly composed of aluminum oxide and having a textured shape in a surface and
an intermediate layer disposed between the glass substrate and the oxide layer. The intermediate layer includes sheet-like crystals that are stacked so that their surfaces are parallel to the surface of the substrate.

7 Claims, 9 Drawing Sheets

THETA 1

OPTICAL MEMBER AND METHOD FOR MAKING THE SAME

TECHNICAL FIELD

The present invention relates to an optical member having antireflection performance and a method for making such an optical member.

BACKGROUND ART

The antireflective structure that uses an ultrafine periodic structure not larger than the wavelength in the visible light range is known to exhibit superb antireflection performance in a wide range of wavelengths when the ultrafine periodic structure has appropriate pitch and height. An example of the method for forming the ultrafine periodic structure is formation of a film by application of a dispersion of fine particles having a subwavelength diameter.

According to a method for forming an ultrafine periodic structure by forming a pattern with a micromachining device (e.g., an electron beam lithography system, a laser interferometry exposure system, a semiconductor exposure system, or an etching system), the pitch and height can be controlled. It is known that ultrafine periodic structures having good antireflection performance can be produced by this method.

Another example is a method that yields the antireflective effect by allowing a textured structure composed of boehmite, i.e., aluminum oxide monohydrate, to grow on a substrate. According to this method, an aluminum oxide film formed by vacuum deposition or a liquid phase technique (sol-gel technique) is treated with water vapor or immersed in hot water to convert the surface layer into boehmite and form an ultrafine periodic structure, thereby forming an antireflection film (refer to PTL 1).

Although textured structures composed of boehmite can be easily fabricated by such water vapor treatment or immersion in hot water, exposure of substrates to water vapor or hot water is unavoidable. Thus, when the substrate is composed of glass, the glass component may partly elute during immersion in hot water, thereby inhibiting the growth of the boehmite textured structure, or may remain in the textured structure, thereby degrading the antireflection performance. Moreover, since elution of components in the glass readily occurs, some glass component may elute when simply left in a high-temperature, high-humidity environment for a long time, and the performance of the boehmite antireflective film may be deteriorated as a consequence.

CITATION LIST

Patent Literature

PTL 1: Japanese Patent Laid-Open No. 9-202649

SUMMARY OF INVENTION

It is desirable to provide an optical member in which the influence of the components eluting from the substrate is reduced and the stable antireflection performance can be exhibited irrespective of the type of substrate, and a method for making such an optical member.

According to an aspect of the present invention, an optical member includes a glass substrate and an antireflection film disposed on a surface of the glass substrate. The antireflection film includes an oxide layer mainly composed of aluminum oxide and having a textured shape in a surface and an intermediate layer disposed between the glass substrate and the oxide layer. The intermediate layer includes a plurality of layers, each of the layers including sheet-like crystals arranged in a direction of the surface of the glass substrate with their surfaces extending parallel to the surface of the glass substrate. The plurality of layers are stacked so that a surface of at least one sheet-like crystal in an upper layer is positioned above a gap between two adjacent sheet-like crystals in a lower layer.

According to another aspect of the present invention, a method for making an optical member including a glass substrate and an antireflection film on a surface of the glass substrate includes applying a liquid in which sheet-like crystals are dispersed onto a glass substrate and drying the applied liquid to form an intermediate layer; and forming a film mainly composed of aluminum oxide on the intermediate layer and immersing the film in hot water to form a textured shape in a surface.

The optical member can exhibit stable antireflection performance irrespective of the type of the glass substrate, and such ah optical member can be made by the method described above.

Further features of the present invention will become apparent from the following description of exemplary embodiments with reference to the attached drawings.

DESCRIPTION OF EMBODIMENTS

Embodiments of the present invention will now be described in detail.

An optical member according to an embodiment of the present invention includes a glass substrate and an antireflection film formed on a surface of the glass substrate. The antireflection film includes an oxide layer mainly composed of aluminum oxide and having a textured shape in a surface, and an intermediate layer disposed between the glass substrate and the oxide layer. The intermediate layer includes sheet-like crystals that are stacked so that their surfaces are parallel to the surface of the substrate.

A method for making an optical member including a glass substrate and an antireflection film on a surface of the glass substrate according to another embodiment of the present invention includes steps of applying a liquid in which sheet-like crystals are dispersed onto a glass substrate and drying the applied liquid to form an intermediate layer; and forming a film mainly composed of aluminum oxide on the intermediate layer and immersing the film in hot water to form a textured shape in a surface.

Figure 1:
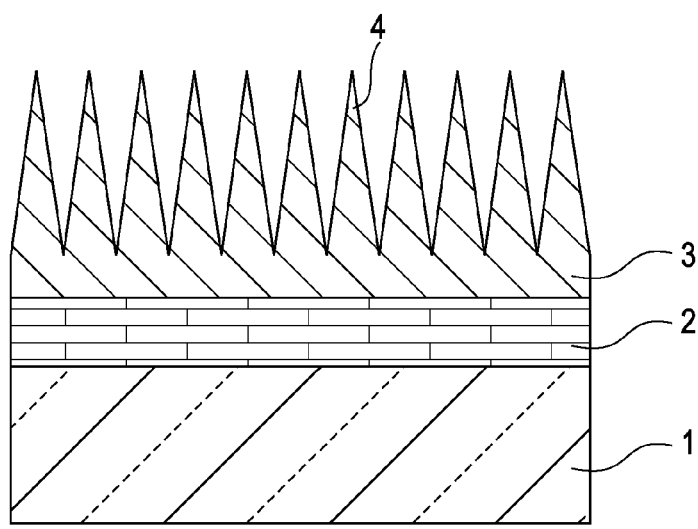
FIG. 1 is a schematic diagram showing an optical transparent member according to one embodiment of the present invention.

FIG. 1 is a schematic view of an optical member according to an embodiment of the present invention. Referring to FIG. 1, the optical member includes a substrate 1 composed of glass, an intermediate layer 2 on a surface of the substrate 1, and an oxide layer 3 disposed on a surface of the intermediate layer 2. The intermediate layer 2 is constituted by sheet-like crystals stacked so that their surfaces are parallel to the surface of the glass substrate 1. The oxide layer 3 is mainly composed of aluminum oxide, has a textured surface, and is constituted by plate crystals arranged next to each other. In the description below, the oxide layer 3 having this structure is referred to as "plate crystal layer 3". The plate crystals that form the plate crystal layer 3 refer to plate-shaped crystals that grow and precipitate on a surface layer of an aluminum oxide film by deflocculation when the aluminum oxide film is immersed in hot water.

Figure 2:
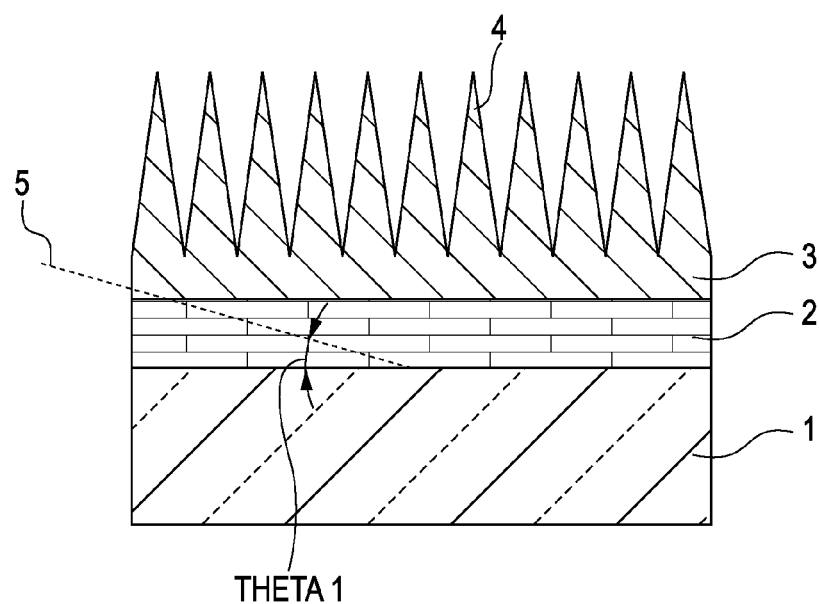
FIG. 2 is a schematic diagram showing an optical transparent member according to one embodiment of the present invention.

FIG. 2 shows the case in which the surface of the substrate 1 is flat, i.e., a flat glass substrate. The sheet-like crystals that form the intermediate layer 2 may be arranged so that the angle theta 1 with respect to the substrate surface, i.e., the angle between an inclination direction 5 of the surface of the sheet-like crystals and the substrate surface, is 10 degrees or less and preferably 6 degrees of less on average. In this description, the sheet-like crystals are defined to be "parallel" to the surface of the substrate when the angle theta 1 is 10 degrees or less on average. When the angle theta 1 is more than 10 degrees, stacking of crystals in the intermediate layer 2 may be disturbed and the intermediate layer 2 may exhibit a decreased effect as a protection layer preventing the elution from the glass substrate or may result in variation in film thickness. As a result, the antireflection performance may become uneven within the film.

The sheet-like crystals constituting the intermediate layer 2 are stacked so that crystals are piled on top of each other. As shown in FIGS. 1 and 2, the intermediate layer 2 is illustrated by a brick wall pattern. In this invention, "piled on top of each other" refers to a state in which there are at least two layers (upper layer and lower layer) of sheet-like crystals that are piled on top of each other.

In other words, in the intermediate layer 2, a plurality of sheet-like crystals are arranged so that their surfaces are parallel to the substrate surface but oriented at random in terms of directions parallel to the substrate surface, and additional sheet-like crystals are further disposed on the plurality of randomly oriented sheet-like crystals with their surfaces parallel to the substrate surface but oriented at random in terms of directions parallel to the substrate surface. In other words, a plurality of layers each constituted by randomly oriented sheet-like crystals are stacked in a direction perpendicular to the substrate surface.

In particular, the intermediate layer 2 has a plurality of layers stacked in the direction perpendicular to the glass substrate surface and each of the layers includes a plurality of sheet-like crystals having surfaces extending parallel to the glass substrate surface. Of the sheet-like crystals arranged parallel to the glass substrate surface, any adjacent two sheet-like crystals are overlaid by at least one sheet-like crystal which forms part of the upper layer so that the surface of the at least one sheet-like crystal is located above the gap between the two sheet-like crystals of the lower layer. In other words, a plurality of layers are stacked so that at least one sheet-like crystal in an upper layer is located over and across at least two sheet-like crystals in a lower layer among the plurality of sheet-like crystals arranged parallel to the substrate surface. In this description, this state is referred to as "piled on top of each other".

According to this arrangement, the moisture about to penetrate into gaps between sheet-like crystals is blocked by the surfaces of the sheet-like crystals of the upper or lower layer, thereby extending the diffusion path in the perpendicular direction. Accordingly, the contact between the glass substrate surface and moisture can be suppressed. Sheet-like crystals are plate-shaped crystals with bottoms having a polygonal shape, a circular shape, an elliptical shape, etc. The bottoms of the crystals are referred to as "surface" or "sheet surface" in this invention. The shape of the sheet-like crystals that can be used in this invention is a shape having an aspect ratio (ratio of the longest side of the surface to the thickness) of 20 or more. When the aspect ratio is less than 20, it becomes difficult to arrange sheet-like crystals in parallel to the glass substrate surface. For example, the longest side of the surface may be 10 nm or more and 500 nm or less and thickness may be 0.5 nm to 25 nm. When the longest side and/or thickness is larger than this, it becomes difficult to arrange crystals in parallel to the glass substrate. When smaller, the crystals may be affected by the components eluting from the substrate.

The plate crystal layer 3 mainly composed of aluminum oxide is formed of crystals mainly composed of aluminum oxide or hydroxide or a hydrate of aluminum oxide or hydroxide. Boehmite may be used as the crystals. When these plate crystals are used, the end portions (surface) form a fine textured shape 4. In order to increase the height of the fine textures and narrow the gaps between crystals, the plate crystals are selectively arranged by forming a particular angle with respect to the substrate surface.

In this invention, the aluminum oxide or hydroxide or a hydrate of aluminum oxide or hydroxide is referred to as "aluminum oxide". One or more oxide layers containing only aluminum oxide, or one of $ZrO_2$, $SiO_2$, $TiO_2$, ZnO, and MgO and 70 mol % or more and preferably 90 mol % or more of aluminum oxide are referred to as "layers mainly composed of aluminum oxide".

Figure 3:
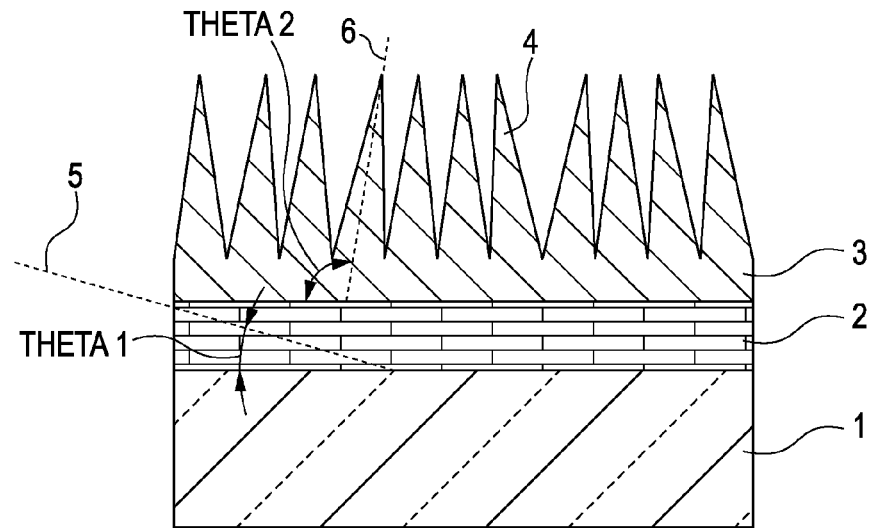
FIG. 3 is a schematic diagram showing an optical transparent member according to one embodiment of the present invention.

FIG. 3 shows the case in which the surface of the substrate 1 is flat, i.e., a flat glass substrate. The plate crystals may be arranged so that an angle theta 2 with respect to the substrate surface, i.e., the angle between an inclination direction 6 of the plate crystals and the substrate surface, is 45 degrees or more and 90 degrees or less and preferably 60 degrees or more and 90 degrees or less on average.

Figure 4:
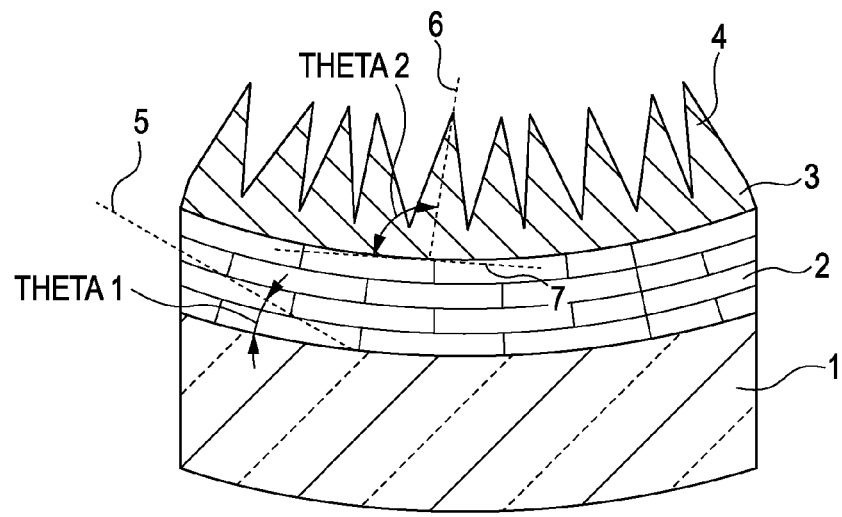
FIG. 4 is a schematic diagram showing an optical transparent member according to one embodiment of the present invention.

FIG. 4 shows the case in which the surface of the substrate 1 is curved two-dimensionally or three-dimensionally. The plate crystals may be arranged so that the angle theta 2 with respect to the substrate surface, i.e., the angle between the inclination direction 6 of the plate crystals and a tangent line 7 at the substrate surface, is 45 degrees or more and 90 degrees or less and more preferably 60 degrees or more and 90 degrees or less on average.

The thickness of the plate crystal layer 3 is preferably 20 nm or more and 1000 nm or less, and more preferably 50 nm or more and 1000 nm or less. When the thickness is 20 nm or more and 1000 nm or less, the ultrafine textured structure 4 exhibits effective antireflection performance and mechanical strength of the texture are not readily susceptible to damage, thereby yielding an advantage in terms of production cost of ultrafine textured structures. When the thickness is 50 nm or more and 1000 nm or less, the antireflection performance can be further enhanced.

The surface density of the ultrafine textures of the plate crystal layer 3 is also important. The average surface roughness Ra' obtained by surface-expanding the corresponding center-line average roughness is 5 nm or more, preferably 10 nm or more, and more preferably 15 nm or more and 100 nm or less. The surface area ratio Sr is 1.1 or more, preferably 1.15 or more, and more preferably 1.2 or more and 3.5 or less.

One of the processes of evaluating the resulting ultrafine textures is a surface observation of the ultrafine textures through a scanning probe microscope. According to this observation, the average surface roughness Ra' obtained by surface-expanding the center line average roughness, and the surface area ratio Sr of the film are obtained. In particular, the average surface roughness Ra' (nm) is obtained by three-dimensionally expanding the center line average roughness Ra defined in Japanese Industrial Standards (JIS) B 0601 with respect to the measurement surface and is expressed as an "average value of absolute values of deviations from the reference surface to the designated surface" given by equation (1) below:

[Math. 1]
$$Ra' = \frac{1}{S_0} \int_{Y_B}^{Y_T} \int_{X_L}^{X_R} |F(X, Y) - Z_0| d_X d_Y \quad (1)$$

Ra': average surface roughness (nm)

$S_0$: area when the measurement surface is ideally flat, (absolute value of $X_R$–$X_L$)*(absolute value of $Y_T$–$Y_B$)

F(X, Y): height at the measurement point (X, Y), X indicating an X coordinate and Y indicating a Y coordinate $X_L$ to $X_R$: range of X coordinates of the measurement surface $Y_B$ to $Y_T$: range of Y coordinates of the measurement surface $Z_0$: average height within the measurement surface The surface area ratio Sr is given by Sr=S/$S_0$ ($S_0$: area when the measurement surface is ideally flat, S: surface area of the actual measurement surface). The surface area of the actual measurement surface is determined as follows. First, the surface is divided into fine triangles each constituted by nearest neighboring three data points (A,B,C) and the area delta S of each triangle is determined from the vector product. Then delta S (delta ABC)=[s(s–AB)(s–BC)(s–AC)]0.5 (where AB, BC, and AC represent lengths of corresponding sides and s is defined as 0.5 (AB+BC+AC)) is obtained and the total of delta S is the surface area S. When Ra' and Sr relating to the surface density of the ultrafine texture are respectively 5 nm or more and 1.1 or more, the textured structure exhibits antireflection function. When Ra' is 10 nm or more and Sr is 1.15 or more, the textured structure exhibits higher antireflection function. When Ra' is 15 nm or more and Sr is 1.2 or more, performance sufficient for practical use can be obtained. However, when Ra' is 100 nm or more and Sr is 3.5 or more, scattering caused by the textured structure overwhelms the antireflection effect and sufficient antireflection performance will not be obtained.

The plate crystal layer 3 formed of plate crystals mainly composed of aluminum oxide is made by forming a metallic aluminum film or a metal film containing metallic aluminum and one of metallic Zn and metallic Mg on the intermediate layer 2 and then immersing the film in hot water of 50 degrees (celsius) or higher or exposing the film to water vapor. As a result, the plate crystal layer 3 is formed on the surface of the metal by hydration, dissolution, and reprecipitation. Alternatively, the plate crystal layer 3 can be formed by forming a layer mainly composed of aluminum oxide on the intermediate layer 2 and then selectively dissolving the surface or causing precipitation on the surface.

The layer mainly composed of aluminum oxide can be formed by a common vapor phase technique such as chemical vapor deposition (CVD) or plasma vapor deposition (PVD), a liquid phase technique such as a sol-gel technique, or a hydrothermal synthesis technique using an inorganic salt. According to the method of forming plate crystals of aluminum oxide, amorphous aluminum oxide layers sometimes remain in the lower portion of the textured shape 4 in the plate crystal layer 3.

In order to form a homogeneous antireflection layer on a large substrate or a non-flat substrate, alumina plate crystals may be grown by applying an aluminum oxide precursor sol on a substrate to form an aluminum oxide film and then treating the aluminum oxide film with hot water.

An aluminum compound or a mixture of an aluminum compound and at least one compound selected from Zr, Si, Ti, Zn, and Mg compounds is used as the raw material for the aluminum oxide precursor sol. Various compounds such as metal alkoxides, chlorides, and salts such as nitrates can be used as the raw materials for $Al_2O_3$, $ZrO_2$, $SiO_2$, $TiO_2$, ZnO, and MgO. From the viewpoint of film-forming properties, metal alkoxides may be used as the raw materials for $ZrO_2$, $SiO_2$, and $TiO_2$.

Examples of the aluminum compound include aluminum ethoxide, aluminum isopropoxide, aluminum-n-butoxide, aluminum-sec-butoxide, aluminum-tert-butoxide, aluminum acetylacetonate, and oligomers of these; and aluminum nitrates, aluminum chlorides, aluminum acetates, aluminum phosphates, aluminum sulfates, and aluminum hydroxides.

Specific examples of the zirconium alkoxide include zirconium tetramethoxide, zirconium tetraethoxide, zirconium tetra-n-propoxide, zirconium tetraisopropoxide, zirconium tetra-n-butoxide, and zirconium tetra-tert-butoxide.

Compounds represented by general formula Si(OR)$_4$ may be used as the silicon alkoxide. Examples of such compounds include those represented by Si(OR)$_4$ where each R represents a lower alkyl group such as a methyl group, an ethyl group, a propyl group, an isopropyl group, a butyl group, or an isobutyl group. The groups R may be the same as or different from one another.

Examples of the titanium alkoxide include tetramethoxytitanium, tetraethoxytitanium, tetra-n-propoxytitanium, tetraisopropoxytitanium, tetra-n-butoxytitanium, and tetraisobutoxytitanium.

Examples of the zinc compounds include zinc acetate, zinc chloride, zinc nitrate, zinc stearate, zinc oleate, and zinc salicylate. Zinc acetate or zinc chloride may be used as the zinc compound.

Examples of the magnesium compound include magnesium alkoxides such as dimethoxymagnesium, diethoxymagnesium, dipropoxymagnesium, and dibutoxymagnesium, magnesium acetylacetonate, and magnesium chloride.

The raw material for the aluminum oxide precursor sol contains a solvent, in particular, an organic solvent.

Any organic solvent that does not gelate the raw material such as alkoxide may be used as the organic solvent. Examples of the organic solvent include monohydric alcohols such as methanol, ethanol, 1-propanol, 2-propanol, 1-butanol, 2-butanol, 2-methylpropanol, 1-pentanol, 2-pentanol, cyclopentanol, 2-methylbutanol, 3-methylbutanol, 1-hexanol, 2-hexanol, 3-hexanol, 4-methyl-2-pentanol, 2-methyl-1-pentanol, 2-ethylbutanol, 2,4-dimethyl-3-pentanol, 3-ethylbutanol, 1-heptanol, 2-heptanol, 1-octanol, and 2-octanol; dihydric or higher alcohols such as ethylene glycol and triethylene glycol; ethers such as ether alcohols, e.g., methoxyethanol, ethoxyethanol, propoxyethanol, isopropoxyethanol, butoxyethanol, 1-methoxy-2-propanol, 1-ethoxy-2-propanol, and 1-propoxy-2-propanol, and ethers such as dimethoxyethane, diethylene glycol dimethyl ether, tetrahydrofuran, dioxane, diisopropyl ether, and cyclopentyl methyl ether; esters such as ethyl formate, ethyl acetate, n-butyl acetate, ethylene glycol monomethyl ether acetate, ethylene glycol monoethyl ether acetate, ethylene glycol monobutyl ether acetate, and propylene glycol monomethyl ether acetate; various aliphatic or alicyclic hydrocarbons such as n-hexane, n-octane, cyclohexane, cyclopentane, and cyclooctane; aromatic hydrocarbons such as toluene, xylene, and ethyl benzene; ketones such as acetone, methyl ethyl ketone, methyl isobutyl ketone, and cyclohexanone; various chlorinated hydrocarbons such as chloroform, methylene chloride, carbon tetrachloride, and tetrachloroethane; and aprotic polar solvents such as N-methyl pyrrolidone, N,N-dimethylformamide, N,N-dimethylacetamide, and ethylene carbonate.

Of the solvents described above, alcohols may be used to improve the stability of solutions.

When alkoxide raw materials are used, in particular, when alkoxides of aluminum, zirconium, and titanium that have high reactivity to water are used, rapid hydrolysis occurs by moisture in the air or addition of water, resulting in clouding and sedimentation of the solutions. The aluminum salt compounds, zinc salt compounds, and magnesium salt compounds are difficult to dissolve in organic solvents and the stability of the resulting solutions is low. To address this difficulty, a stabilizer may be added to stabilize the solution. Examples of the stabilizer include beta-diketone compounds such as acetyl acetone, dipyruvyl methane, trifluoroacetylacetone, hexafluoroacetylacetone, benzoylacetone, and dibenzoyl methane; beta-ketoester compounds such as methyl acetoacetate, ethyl acetoacetate, allyl acetoacetate, benzyl acetoacetate, iso-propyl acetoacetate, tert-butyl acetoacetate, iso-butyl acetoacetate, 2-methoxyethyl acetoacetate, and methyl 3-keto-n-valerate; and alkanol amines such as monoethanolamine, diethanolamine, and triethanolamine. The amount of the stabilizer added may be 1 in terms of molar ratio relative to the alkoxides and salt compounds. In order to form an adequate precursor, a catalyst may be added after addition of the stabilizer to accelerate part of reaction. Examples of the catalyst include nitric acid, hydrochloric acid, sulfuric acid, phosphoric acid, acetic acid, and ammonia. A dipping technique, a spin-coating technique, a spraying technique, a printing technique, a flow-coating technique, any combination of these techniques, and any other known coating techniques may be used as the method for forming the film using the aluminum oxide precursor sol.

After the aluminum oxide precursor sol is applied, the applied sol may be heated in the temperature range of 100 to 230 degrees (celsius). The higher the heating temperature, the higher the density of the film. However, if the heating temperature exceeds 230 degrees (celsius), damage such as deformation occurs in the substrate. The heating temperature may be 120 degrees (celsius) or more and 200 degrees (celsius) or less. The heating time may be 10 minutes or longer although it depends on the heating temperature.

The aluminum oxide film subjected to drying or heating is immersed in hot water to precipitate plate crystals mainly composed of aluminum oxide and create a textured shape in the outermost surface of the film. When immersed in hot water, the surface layer of the aluminum oxide film is deflocculated and some components are eluted. Because of differences in solubility of various hydroxides in hot water, plate crystals mainly composed of aluminum oxide precipitate and grow on the surface layer of the aluminum oxide film. The temperature of the hot water may be 40 to 100 degrees (celsius). The time of treatment in hot water is about 5 minutes to 24 hours.

When an aluminum oxide film containing a foreign oxide such as $TiO_2$, $ZrO_2$, $SiO_2$, $ZnO$, or $MgO$ is subjected to treatment in hot water, crystallization occurs due to the difference in solubility of the respective components in hot water. Thus, unlike the treatment of the film solely composed of aluminum oxide in hot water, the size of the plate crystals can be changed in a wide range by changing the composition of the inorganic components. As a result, it becomes possible to control the textured shape formed by the plate crystals in a wide range. When ZnO is used as the auxiliary component, coprecipitation with aluminum oxide is possible; thus, the refractive index can be controlled in a wide range and good antireflection performance can be yielded.

The intermediate layer 2 is constituted by sheet-like crystals (plate crystals) with their surfaces (plate surfaces) extending in parallel to the surface of the substrate 1. Any material that has sheet-like crystals can be used to yield the advantages of the present invention. Examples of such a material include layered phyllosilicate minerals, layered polysilicates, and layered double hydroxides. Specific examples thereof include smectite, mica, vermiculite, kaolin, magadiite, kenyaite, kanemite, and hydrotalcite.

The intermediate layer 2 is provided to adjust the difference in refractive index between the substrate 1 and the plate crystal layer 3 mainly composed of aluminum oxide. Thus, the thickness of the intermediate layer 2 is 100 nm or less and preferably 20 nm or more and 80 nm or less. In the case where the plate crystals constituting the intermediate layer 2 are crystals having two optical axes, birefringence occurs which increases the difference in optical path between the normal light ray and the abnormal light ray. This can result in observation of double images through a reflective film. In order to suppress observation of double images, the optical path length of light passing through the intermediate layer 2 may be shortened and the thickness of the intermediate layer 2 may be 100 nm or less. Since film easily becomes uneven during film-forming and refractive index changes locally when the thickness is less than 20 nm, the thickness of the intermediate layer 2 may be 20 nm or more.

The intermediate layer 2 is expected to exhibit an effect of suppressing as much as possible hot water from contacting the surface of the glass substrate during immersion of the aluminum oxide film in hot water. However, since the thickness of the intermediate layer 2 is generally 100 nm or less, it is generally difficult to completely prevent penetration of the hot water at such a thickness. In order to prevent penetration of hot water as much as possible, the crystals constituting the intermediate layer 2 must be sheet-like (plate-like) in shape. A structure formed by stacking sheet-like crystals have a high film density and high adhesion between particles. When plate crystals are piled on top of each other so that the surfaces of the crystals extend in parallel to the glass substrate, the path of diffusion of hot water to the intermediate layer 2 is extended in the perpendicular direction. Thus, even when the thickness of the intermediate layer 2 is 100 nm or less, contact between hot water and the glass substrate surface can be suppressed. In this invention, the "sheet-like crystals" refer to those which have an aspect ratio (the ratio of the longest side of the sheet (plate) surface to the thickness) of 20 or more. When the aspect ratio is less than 20, it becomes difficult to arrange sheet-like crystals in parallel to the glass substrate surface.

The layered phyllosilicate minerals, magadiite, kenyaite, kanemite, and layered double hydroxide used in the intermediate layer 2 are excellent in terms of water sealing property. All of the materials have layers strongly bonded to each other through hydrogen bonding or electrostatic force. Furthermore, it is presumed that OH groups that are present at the end surfaces of the crystal particles bond crystal particles to one another through hydrogen bonding. Accordingly, when crystals are piled on top of one another to form an intermediate layer, the intermediate layer becomes firm and can effectively present penetration of water molecules.

Smectite that can be used in the intermediate layer 2 is excellent in terms of prevention of penetration of water molecules. Smectite is constituted by negatively charged sheets (sheet-like crystals) each 1 nm in thickness and cations present between the sheets (sheet-like crystals). When the cations between the layers are hydrating metal ions such as sodium and calcium ions, the water molecules are captured between the smectite layers, resulting in bulging of smectite. As a result of bulging of the smectite, the gaps between the smectite particles are buried and the gaps through which the water molecules can penetrate into the intermediate layer 2 are further narrowed. Thus, corrosion of the glass substrate by water can be prevented.

Smectite is known to incorporate large quantities of water molecules between layers when reacted with large quantities of water molecules and ultimately form a single sheet (sheet-like crystals) 1 nm in thickness dispersed in water.

In this embodiment, since the plate crystal layer 3 is present on the intermediate layer 2, the plate crystal layer 3 exhibits a water sealing effect and prevents excessive penetration of moisture. Thus, the phenomenon of smectite becoming dispersed in water can be suppressed. Moreover, since the thickness of the intermediate layer 2 is 100 nm or less and the structure is formed by stacking sheet-like crystals so that the sheet surfaces are parallel to the glass substrate, penetration of water molecules is inhibited and the reactivity to the water solvent is reduced compared to massive smectite powder. Thus, even when the smectite is used in the intermediate layer, dispersion in water does not occur.

The intermediate layer 2 may include a plurality of layers and at least one organic compound between the layers. In other words, corrosion of the glass substrate by water can be prevented by the use of an intercalation compound, i.e., a compound including sheet-like crystals and an organic compound between the crystal layers, in the intermediate layer 2. The organic compound to be intercalated between the layers may be a compound having a hydrophobic group. When the compound has a hydrophobic group, the sheet-like particles, i.e., the intercalation compound, exhibits hydrophobicity. As a result, the intermediate layer 2 becomes water-repellent and corrosion of the glass substrate by water can be prevented.

The intercalation compound can be formed by exchanging the ions present between layers with those of a desired organic compound or by modifying silanol groups on the surfaces of the sheet-like crystals with a silane coupling agent or the like, for example.

An ion exchange method for exchanging the ions present between layers with those of a desired organic compound is useful when ions are present and smectite, layered double hydroxide, or the like that can be subject to ion exchange is used as the sheet-like crystals. In particular, after formation of the film for the intermediate layer 2, the glass substrate is immersed in a solution dissolving ions to be intercalated between layers to conduct ion exchange. The solvent used therefor may be a liquid that has an affinity sufficient for dissolving ions but not for dispersing the intermediate layer 2 in the solvent. Specific examples thereof include water, alcohol, formamide, or mixtures of these.

The organic compound to be intercalated between layers of the sheet-like crystals by ion exchange may be charged ions with charges that form pairs with charges of the crystal layers. In particular, when smectite having negatively charged crystal layers is used, primary to quaternary ammonium cations, phosphonium cations, etc., may be used. When a positively charged layered double hydroxide is used, anions having carboxyl groups, sulfonic acid groups, etc., can be used. In order to further improve the water sealing performance of the intermediate layer 2, an organic compound having a hydrophobic group may be used. Examples of such an organic compound include compounds having long chain alkyl groups, fluoro groups, etc., in the main chain.

The method for modifying the silanol groups on the surfaces of the sheet-like crystals with a silane coupling agent or the like may be employed when a layered polysilicate such as magadiite is used as the sheet-like crystals of the intermediate layer 2. The silane coupling agent may have a hydrophobic group such as a long chain alkyl group or a fluoro group to improve the water sealing performance of the intermediate layer 2. An example of a specific interlayer modification method is a method involving forming a film of the intermediate layer 2, intercalating a surfactant such as a quaternary amine between layers of sheet-like crystals, and then modifying the molecules between layers with a silane coupling agent. Because the quaternary amine surfactant is intercalated between the layers to render the gaps between layers hydrophobic, the compatibility between the hydrophobic group-containing silane coupling agent and the interlayer molecules is enhanced, thereby promoting the modification of the silanol groups on the surfaces of sheet-like crystals.

The refractive index of the intermediate layer 2 can be controlled by intercalating an organic compound between the sheet-like crystal layers of the intermediate layer 2. As with a layered phyllosilicate mineral, magadiite, or a layered double hydroxide, when the thickness of one sheet-like crystal is 2.0 nm or less and sufficiently smaller than the wavelength of the visible light, the difference in refractive index between the gap between the crystal layers and one layer of crystals can be considered on the basis of average. When an organic compound having a refractive index different from that of the sheet-like crystal is introduced, the refractive index of the intermediate film can be controlled. Moreover, it is also possible to expand the space between closed sheet-like crystal layers by intercalation of the organic compound so that the intercalated organic compound can function as pillars supporting the sheet-like crystals, thereby creating a space between crystal layers. Since the refractive index of air is 1.0, i.e., the lowest value, it becomes possible to lower the refractive index of the intermediate layer as a whole owing to the space several nanometers in size between the sheet-like crystal layers. Examples of the organic compound that can form a pillar when smectite is used include cationic tetramethylammonium ions and ions of cage silsesquioxane terminated with cationic functional groups.

Examples of the techniques for stacking the sheet-like crystal parallel to the glass substrate to form the intermediate layer 2 include a dipping technique, a spin-coating technique, a spraying technique, a printing technique, a flow-coating technique, a slit-coating technique, and any combination of the foregoing by using a dispersion containing exfoliated plate crystals.

In order to exfoliate the sheet-like crystals and disperse the exfoliated plate crystals in the solvent, the sheet-like crystals must have a swelling property for the solvent used. For example, when smectite or swelling mica is used as the sheet-like crystals, water or formamide may be used as the solvent. When smectite is added to the solvent and the mixture is stirred, the smectite swells, exfoliates, and disperses in the solvent, thereby forming a transparent suspension. When a layered double hydroxide is used as the sheet-like crystals, a transparent suspension can be obtained by adding a layered double hydroxide having interlayer anions converted into nitrites to a formamide solvent and stirring the resulting mixture.

The swelling property can be imparted to the crystals by modifying the surfaces of the sheet-like crystals. For example, surfaces of the layered polysilicate such as magadiite may be modified with a long chain alkyl-containing silane coupling agent so that the crystals can be dispersed in an organic solvent such as chloroform, benzene, or toluene.

After application of the dispersion containing exfoliated sheet-like crystals, heating may be performed at 20 degrees (celsius) to 200 degrees (celsius) for about 5 minutes to 2 hours to remove the solvent. For the smooth operation and prevention of thermal damage on the glass substrate, the dispersion may be dried at 20 degrees (celsius) to 60 degrees (celsius) within 30 minutes. Because sheet-like crystals are used, the adhesion to the glass substrate and the properties of the particles remain unchanged despite the short drying time at normal temperature as long as the solvent can be vaporized by drying.

Examples of the glass substrate include those that contain $SiO_2$, $BaO$, $La_2O_3$, $TiO_2$, $Nb_2O_5$, $ZrO_2$, $ZnO$, and/or $B_2O_5$ as a constitutional component. The glass may contain at least one selected from $BaO$, $La_2O_3$, and $TiO_2$. In particular, glass containing $BaO$, $La_2O_3$, and/or $TiO_2$ are favored since they are available in various types and offer a wide range of refractive index, i.e., from low to high refractive index. When such glass is used in combination with the intermediate layer 2, the influence of the trace amounts of eluted components that are generated during formation of the textured structure of aluminum oxide boehmite can be suppressed and a high antireflection property can be obtained.

The substrate used in this invention may be any substrate that can ultimately be rendered a shape suitable for the purpose of use. The substrate may be a flat plate, a film, a sheet, or the like, and may have a two-dimensionally or three-dimensionally curved surface.

The optical member may further include a layer or layers that impart various functions to the optical member. For example, in order to improve the film hardness, a hard coat layer may be formed on the plate crystal layers or a water-repellent film layer composed of, for example, fluoroalkylsilane or alkylsilane may be formed to impart water repellency. A layer composed of a material having a lower refractive index than the plate crystals mainly composed of aluminum oxide or a layer composed of an amphiphilic compound may be provided to the plate crystals for the antifouling purposes etc. An adhesive layer or a primer layer may be formed to improve the adhesiveness between the substrate and the intermediate layer.

The optical member can be used in various optical systems.

Examples of the optical systems include imaging optical systems used in imaging lenses of cameras, projection optical systems used in projectors, and observation optical systems used in binoculars.

EXAMPLES

The present invention will now be described in specific detail by using examples which do not limit the scope of the invention.

(1) Preparation of Smectite Suspension 1

In 491 g of ion exchange water, 9.0 g synthetic smectite (trade name: Laponite XLG, produced by Rockwood Additives Limited) was dispersed to prepare a smectite suspension 1.

(2) Preparation of $SiO_2$—$TiO_2$ Sol 2

To 14.6 g ethyl silicate, 3.15 g 0.01 M diluted hydrochloric acid [HClaq.] and 29.5 g 1-butanol/2-propanol (IPA) (1/1(wt/wt)) mixed solvent were slowly added and the resulting mixture was stirred at room temperature. After 6 hours of stirring, the mixture was diluted with 92.5 g 1-butanol/IPA (1/1(wt/wt)) mixed solvent to prepare a solution A. In 25.5 g 1-butanol/IPA (1/1(wt/wt)) mixed solvent, 10.2 g tetra-n-butoxytitanium and then 3.9 g ethyl acetoacetate were dissolved. The resulting solution was stirred for 3 hours at room temperature to prepare a solution B. To the solution A, the solution B was slowly added under stirring, and the resulting mixture was further stirred for 3 hours at room temperature to prepare a $SiO_2$—$TiO_2$ sol solution 2 having a Si/Ti molar ratio of 7/3.

(3) Preparation of Aluminum Oxide Precursor Sol 3

17.2 g $Al(O\text{-}sec\text{-}Bu)_3$, 4.56 g 3-oxobutanoic acid ethyl ester, and 4-methyl-2-pentanol were mixed and stirred to give a homogeneous mixture. In a 4-methyl-2-pentanol/1-ethoxy-2-propanol mixed solvent, 1.26 g 0.01 M diluted hydrochloric acid was dissolved, and the resulting solution was slowly added to the $Al(O\text{-}sec\text{-}Bu)_3$ solution. The resulting mixture was thoroughly stirred. The solvent was adjusted so that a mixed solvent containing 53.2 g 4-methyl-2-pentanol and 22.8 g 1-ethoxy-2-propanol was ultimately formed. The mixture was stirred in an oil bath at 120 degrees (celsius) for 3 hours or more to prepare an aluminum oxide precursor sol 3.

(4) Preparation of Tetramethylammonium Solution 4

In 500 mL of a solvent containing ethanol and ultrapure water at a volume ratio of 1:1, 54.7 g tetramethylammonium chloride was dissolved to prepare a tetramethylammonium solution 4.

(5) Preparation of Poly(3-Aminopropyl)Siloxane Hydrochloride Solution 5

To 120 mL 0.5 M aqueous hydrochloric acid solution, 8.6 g 3-aminopropyltrimethoxysilane was added and the resulting mixture was stirred for 3 hours at room temperature. The stirred aqueous solution was dried in an oven at 80 degrees (celsius) for 2 days to remove the solvent. The solid matter obtained by drying was dissolved in 480 mL 1:1 (vol/vol) ethanol/ultrapure water mixed solvent to prepare a poly(3-aminopropyl)siloxane hydrochloride solution 5.

(6) Substrate Washing

A disk-shaped glass substrate having a diameter of about 30 mm and a thickness of about 1 mm with one of the surfaces polished and the other frosted was ultrasonically washed in an alkali detergent and dried in an oven.

(7) Measurement of Reflectance

An absolute reflectance meter (USPM-RU produced by Olympus) was used to measure the reflectance at a zero incident angle for a wavelength ranging from 400 nm to 700 nm.

(8) Measurement of Film Thickness and Refractive Index

An spectroscopic ellipsometer (VASE, produced by J. A. Woollam Japan) was used for a wavelength ranging from 380 nm to 800 nm.

(9) Substrate Surface Observation

The substrate surface was treated with Pt and observed with field emission scanning electron microscope (S-5500, produced by Hitachi High-Technologies Corporation) at an acceleration voltage of 10 kV.

(10) Measurement of Thin Film Structure

An X-ray diffractometer (X'Pert PRO, produced by PANalytical) was used for 2theta ranging from 4 to 60 degrees.

Example 1

Four types of glass (A, B, C, and D) washed as above were prepared. Glass A was mainly composed of $SiO_2$ and had a refractive index (nd) of 1.46 and an Abbe number (nud) of 68. Glass B was mainly composed of $SiO_2$ and had a refractive index (nd) of 1.62 and an Abbe number (nud) of 58. Glass C was mainly composed of $La_2O_5$ and had a refractive index (nd) of 1.69 and an Abbe number (nud) of 56. Glass D was mainly composed of $La_2O_5$ and had a refractive index (nd) of 1.77 and an Abbe number (nud) of 50.

An adequate amount of the smectite suspension 1 was added dropwise onto each of the polished surfaces of the glass A to D, and spin-coating was performed at 3000 rpm for 30 seconds. The resulting substrates were dried for 30 minutes at 60 degrees (celsius) to obtain smectite film-coated substrates. The thickness and refractive index of each smectite film was measured through ellipsometry. The thickness and refractive index at a wavelength of 550 nm of the smectite film on the glass A were 34 nm and 1.51, respectively. The thickness and refractive index at a wavelength of 550 nm of the smectite film on the glass B were 25 nm and 1.50, respectively. The thickness and refractive index at a wavelength of 550 nm of the smectite film on the glass C were 25 nm and 1.50, respectively. The thickness and refractive index at a wavelength of 550 nm of the smectite film on the glass D were 34 nm and 1.51, respectively.

Each smectite film was analyzed with an X-ray diffractometer and a diffraction peak attributable to the 001 face of the smectite was confirmed at 2theta of about 6.9 degrees. The diffraction peaks of other crystal surfaces were too weak to be identified. Since the thickness of the smectite film was about 20 nm and the diffraction peak of the 001 face could be confirmed at a significantly high intensity compared to those of other diffraction peaks, it was confirmed that the sheet-like crystals of smectite were stacked in parallel to the glass substrate.

The smectite film coating the glass A was immersed in hot water at 75 degrees (celsius) for 20 minutes and dried at 60 degrees (celsius) for 15 minutes.

Figure 5:
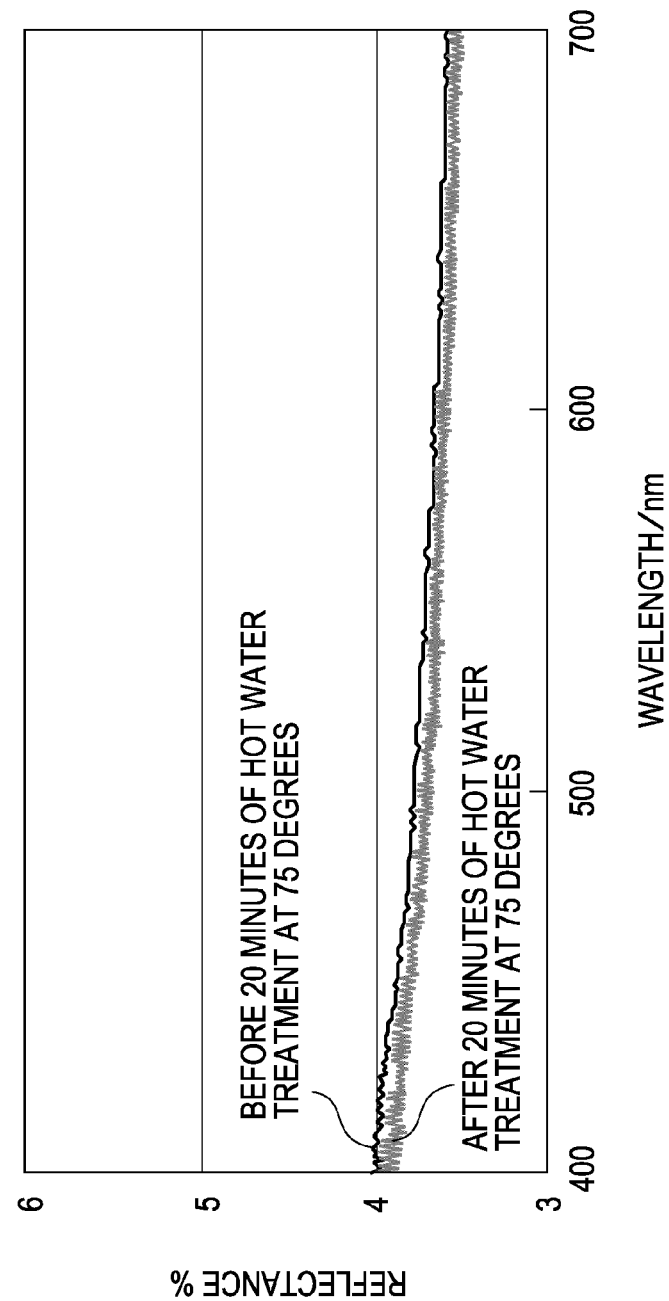
FIG. 5 is a graph showing the absolute reflectance of a smectite optical film formed on glass A in Example 1.

The absolute reflectance of the optical film was measured before and after immersion in hot water. The comparative results are shown in FIG. 5. The results confirmed that the reflectance of the optical film does not substantially change between before and after immersion in hot water.

An adequate amount of the aluminum oxide precursor sol 3 was added dropwise onto the surface of the optical film coated with the smectite film before immersion in hot water and spin-coating was conducted at 3000 rpm for 20 seconds. Then firing was conducted at 200 degrees (celsius) in a convection oven for 120 minutes to form an amorphous aluminum oxide film on the transparent smectite film.

Then the substrate coated with layers was immersed in hot water at 75 degrees (celsius) for 20 minutes and dried at 60 degrees (celsius) for 15 minutes.

The surface of the resulting film was observed by field emission scanning electron microscopy (FE-SEM). An ultrafine textured structure including plate crystals mainly composed of aluminum oxide and arranged at random in a complicated manner was observed.

The glass B, C, and D were treated as with the glass A.

Figure 6:
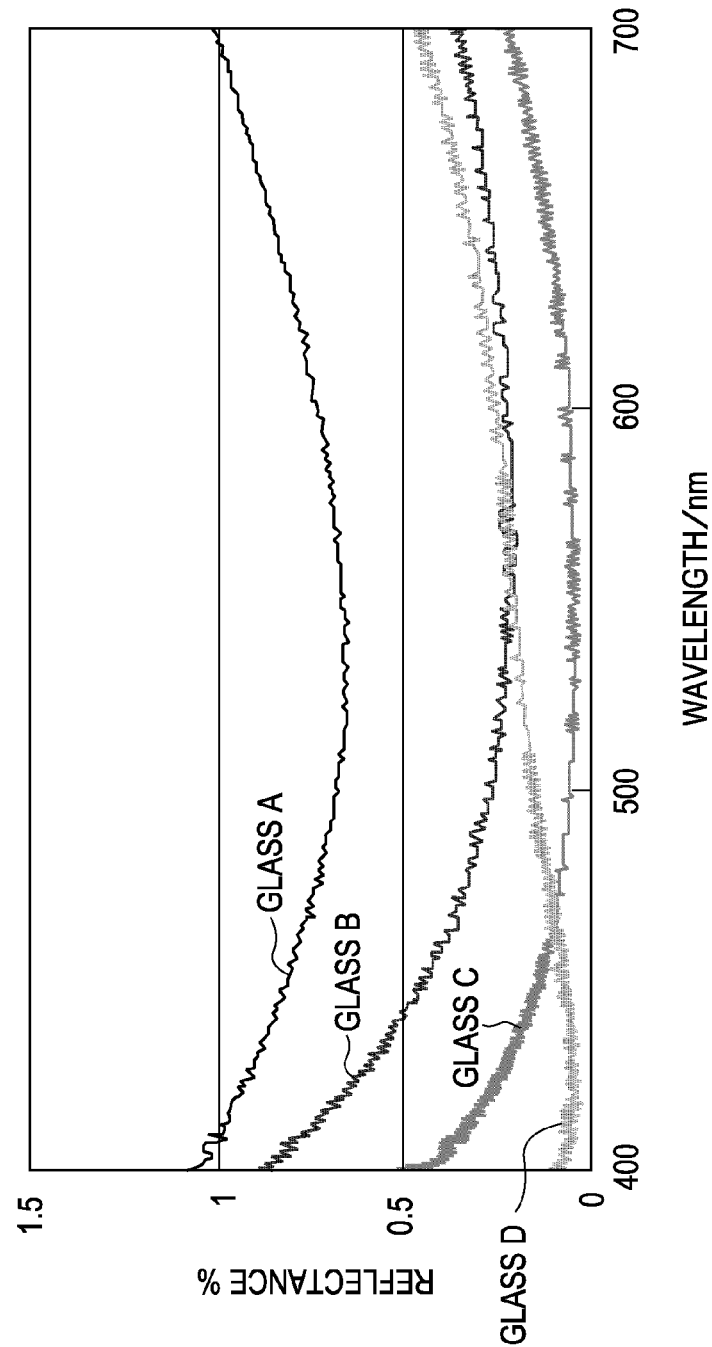
FIG. 6 is a graph showing the absolute reflectance of optical films formed on glass A, B, C, and D in Example 1.

The absolute reflectance of the optical films on the glass A, B, C, and D was measured and the comparative results are shown in FIG. 6. The reflectance not more than 1% was observed from all films. The reflectance decreased with the increase in the refractive index of the glass substrate. At a refractive index of the glass D, the reflectance hit the bottom at a wavelength of about 550 nm and increased thereon. Exfoliation of the films was not observed.

Figure 7:
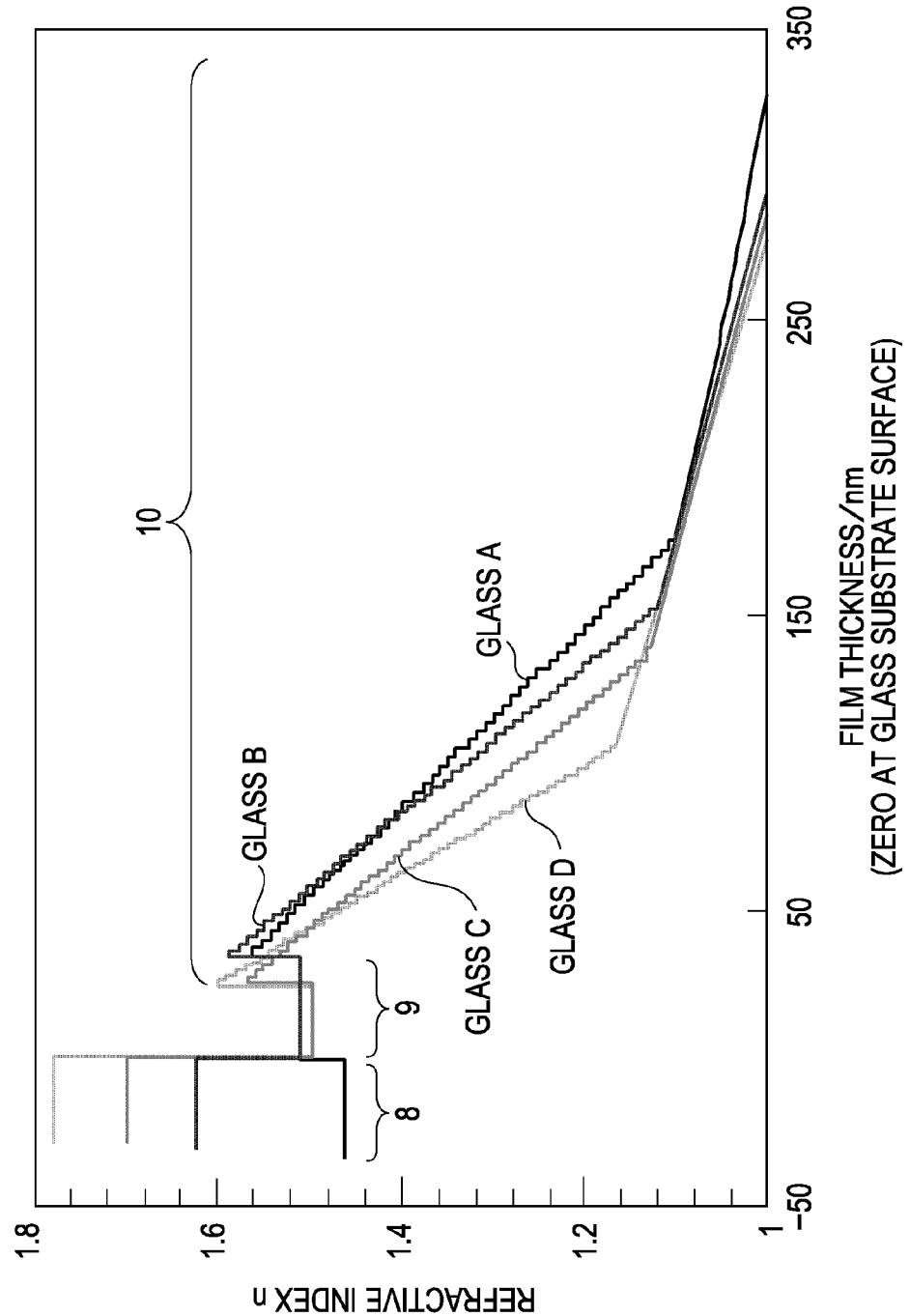
FIG. 7 is a graph showing changes in refractive index of optical films formed on glass A, B, C, and D in Example 1 versus the film thickness.

The relationship between the thickness and refractive index of the optical film was fitted on the basis of the ellipsometry results. The results are shown in FIG. 7. In FIG. 7, the horizontal axis indicates the change in thickness and the vertical axis indicates the change in refractive index. The change in refractive index of the plate crystal layers mainly composed of aluminum oxide was fitted by insertion of one polarization point. The thickness and refractive index of the smectite film were values observed when only one layer of the smectite film was formed. In FIG. 7, a portion 8 indicating the glass substrate, a portion 9 indicating the smectite film, and a portion 10 indicating the plate crystal layer mainly composed of aluminum oxide are clearly distinguished. The refractive index of the plate crystal layer at the border between the portion 9 indicating the smectite film and the portion 10 indicating the plate crystal layer mainly composed of aluminum oxide is substantially the same despite the difference in the glass material. The profiles of the refractive index including one inflection point were also substantially the same.

Example 2

An adequate amount of the smectite suspension 1 was added dropwise onto a polished surface of glass E which was mainly composed of $SiO_2$, had a refractive index (nd) of 1.58 and an Abbe number (nud) of 59, and was washed as above, and spin-coating was performed at 2500 rpm for 30 seconds. The resulting substrate was dried at 60 degrees (celsius) for 60 minutes to obtain a substrate with a smectite film thereon. The thickness and refractive index at wavelength of 550 nm of the smectite film measured by ellipsometry were 58 nm and 1.52, respectively. The smectite film was analyzed with an X-ray diffractometer. As a result, a diffraction peak attributable to the 001 face of the smectite was observed at 2theta of about 6.9 degrees. The diffraction peaks of other crystal faces were too weak to be identified. Since the diffraction peak of the 001 face was substantially intense compared to peaks of other crystal faces, it was confirmed that the sheet-like crystals, smectite, were stacked in parallel to the glass substrate.

The smectite film coating the glass E was warmed to 60 degrees (celsius) and immersed in the tetramethylammonium solution 4 or the poly(3-aminopropyl)siloxane hydrochloride solution 5 for 16 hours. After the immersion, the smectite film was washed with pure water and dried in an oven at 60 degrees (celsius) for 1 hour.

The absolute reflectance of the optical film was measured before and after the immersion, and the thickness and refractive index of the smectite film were measured by ellipsometry. As a result, the thickness of the smectite film on the glass E increased from 58 nm before the immersion in the tetramethylammonium solution 4 to 66 nm after the immersion and the refractive index at a wavelength of 550 nm decreased from 1.52 to 1.49. Before and after the immersion in the poly(3-aminopropyl)siloxane hydrochloride solution 5, the thickness increased from 58 nm to 71 nm and the refractive index at a wavelength of 550 nm decreased from 1.52 to 1.46. The smectite film was analyzed with an X-ray diffractometer. Whereas a diffraction peak attributable to the 001 face of the smectite was observed at 2theta of about 6.9 degrees before immersion in the solution, a diffraction peak was observed at an angle smaller than 2theta of 6.9 degrees after the immersion. In terms of the fundamental plane spacing, the increase of 0.3 to 0.4 nm was observed from the sample after immersion in the solution. This confirmed that organic cations had been intercalated between the layers of the smectite.

Comparative Example 1

The same operation as in Example 1 was conducted except that the smectite suspension 1 was changed to the $SiO_2$—$TiO_2$ sol 2.

Figure 8:
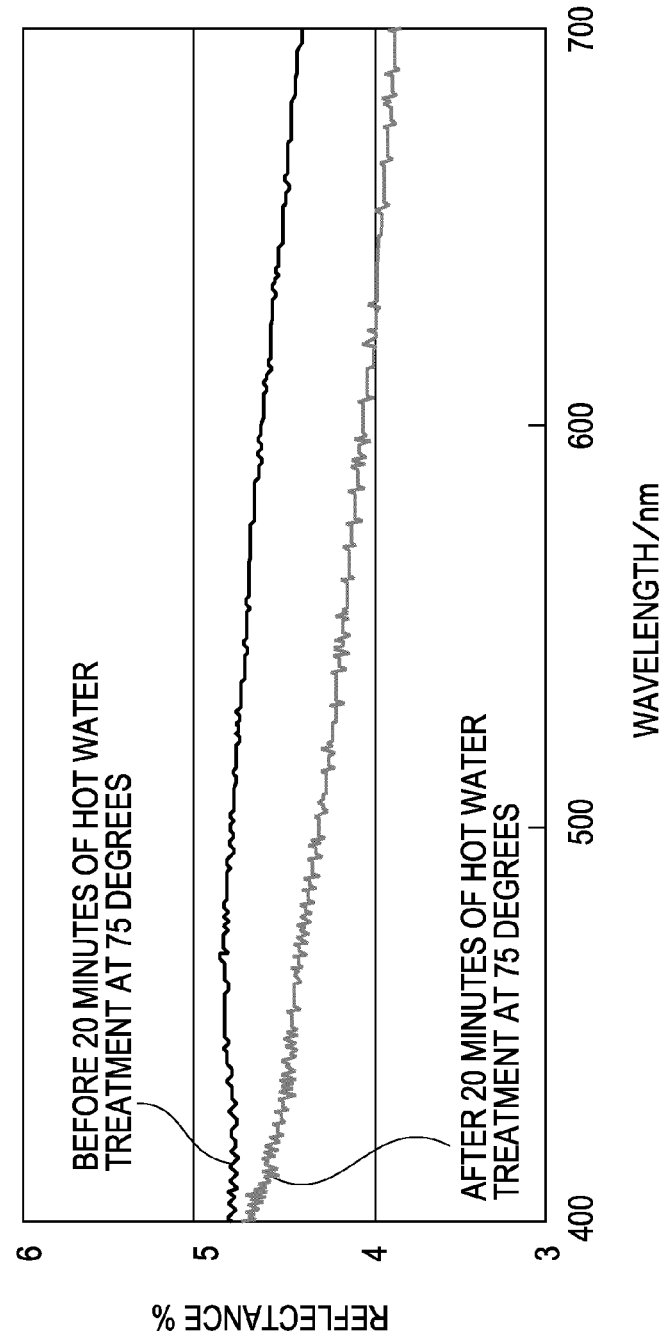
FIG. 8 is a graph showing the absolute reflectance of a $SiO_2$—$TiO_2$ gel optical film formed on glass A in Comparative Example 1.

The absolute reflectance of the optical film prepared by coating the glass A with a $SiO_2$—$TiO_2$ gel film only was measured before and after treating the optical film with hot water at 75 degrees (celsius) for 20 minutes. The comparative results are shown in FIG. 8. The reflectance of the optical films changed between before and after the hot water treatment. However, exfoliation of the films was not observed.

Figure 9:
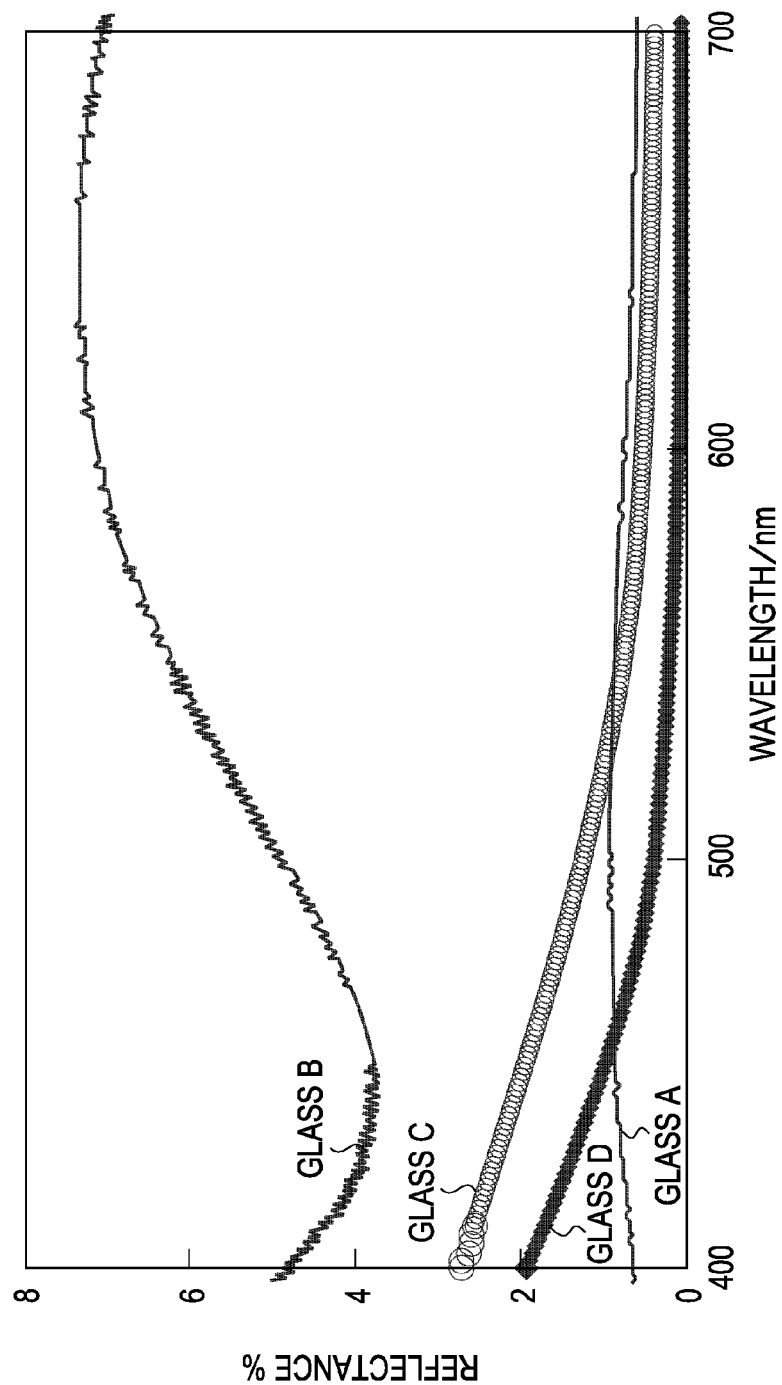
FIG. 9 is a graph showing the absolute reflectance of optical films formed on glass A, B, C, and D in Comparative Example 1.

The absolute reflectance of the optical films on glass A, B, C, and D was measured and the comparative results are shown in FIG. 9. Differences were observed in reflectance of the optical films on four types of glass. In particular, the reflectance of the glass B was notably different from those of other glass. However, exfoliation of the films was not observed. The reflectance of the glass B was notably different from those of other glass presumably due to the strong influence from the eluted glass material.

Figure 10:
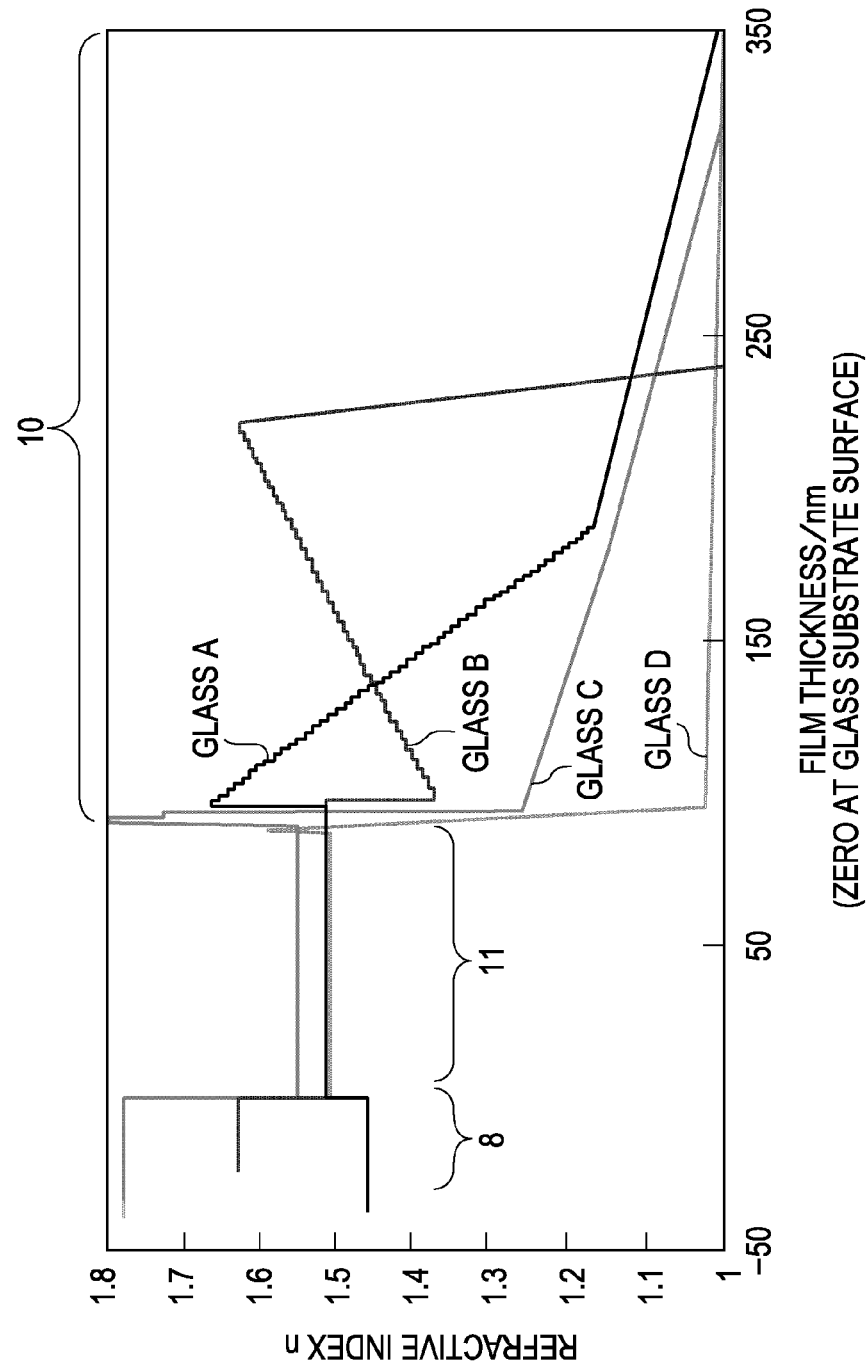
FIG. 10 is a graph showing changes in refractive index of optical films formed on glass A, B, C, and D in Comparative Example 1 versus the film thickness.

The relationship between the thickness and refractive index of the optical film was fitted on the basis of the ellipsometry results. The results are shown in FIG. 10. In FIG. 10, the horizontal axis indicates the change in thickness and the vertical axis indicates the change in refractive index. The change in refractive index of the plate crystal layers mainly composed of aluminum oxide was fitted by insertion of one polarization point. The thickness and refractive index of the $SiO_2$—$TiO_2$ gel film were values observed when only one layer of the $SiO_2$—$TiO_2$ gel film was formed. In FIG. 10, a portion 8 indicating the glass substrate, a portion 11 indicating the $SiO_2$—$TiO_2$ gel film, and a portion 10 indicating the plate crystal layer mainly composed of aluminum oxide are clearly distinguished. The refractive index profiles of the plate crystal layers mainly composed of aluminum oxide were random and it was found that this model is not suited to fitting.

Comparative Example 2

The same operation as in Example 1 was conducted except that the intermediate film was not used.

Figure 11:
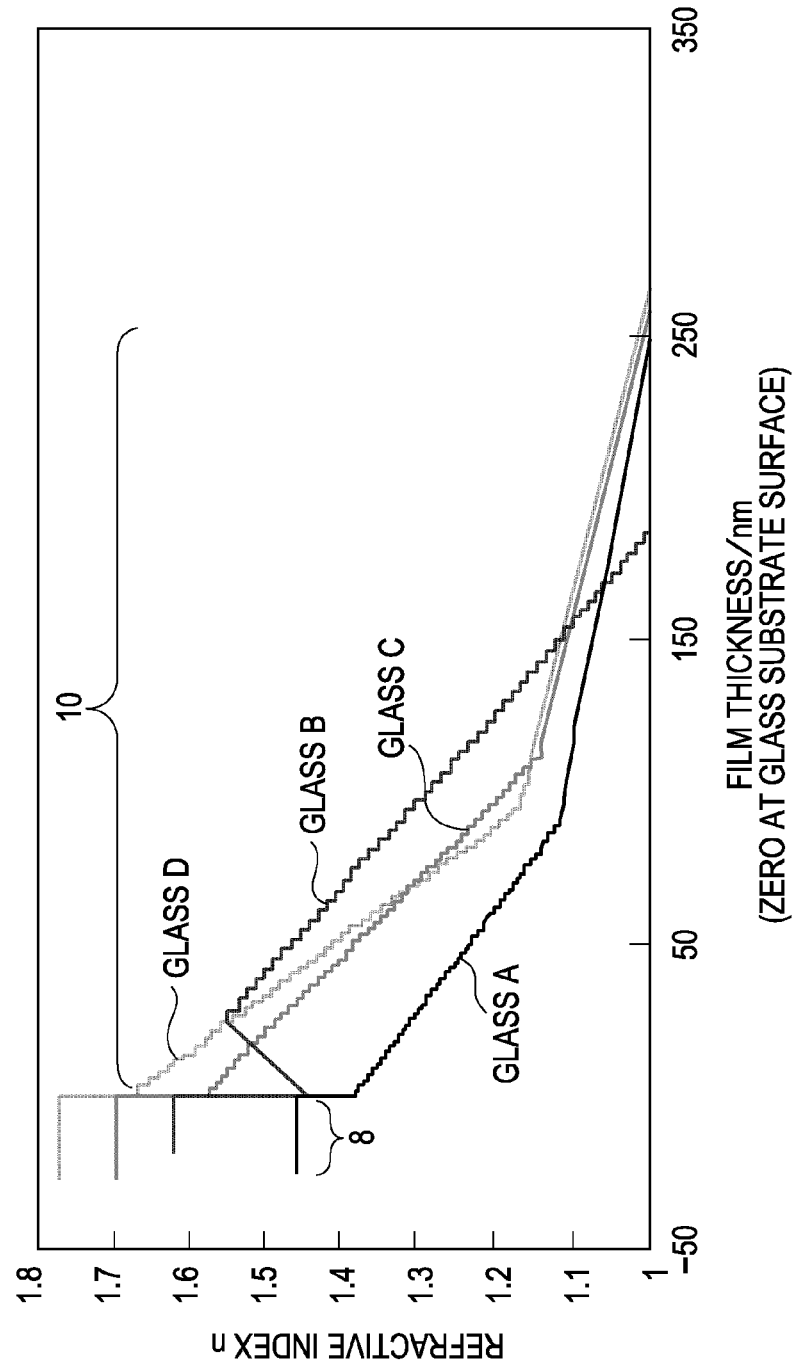
FIG. 11 is a graph showing changes in refractive index of optical films formed on glass A, B, C, and D in Comparative Example 2 versus the film thickness.

The relationship between the thickness and refractive index of the optical film was fitted on the basis of the ellipsometry results. The results are shown in FIG. 11. In FIG. 11, the horizontal axis indicates the change in thickness and the vertical axis indicates the change in refractive index. The change in refractive index of the plate crystal layers mainly composed of aluminum oxide was fitted by insertion of one polarization point. In FIG. 11, a portion 8 indicating the glass substrate and a portion 10 indicating the plate crystal layer mainly composed of aluminum oxide are distinguishable. It was found that the refractive index of the gap between the plate crystal layer mainly composed of aluminum oxide and the glass substrate differs depending on the glass substrate. The refractive index profiles were random and it was found that this model is not suited to fitting.

EVALUATION OF PERFORMANCE

The reflectance of the optical films on various types of glass and the change in refractive index in a perpendicular direction were compared to confirm the influence of the components that slightly elute from the glass. First, from Example 1, it was confirmed that the smectite on the glass substrate does not exfoliate and disperse in water during hot water treatment. Although Example 1 showed that there is dependency between the difference in reflectance caused by the difference in types of glass and the glass refractive index, Comparative Example 1 did not confirm the cause-and-effect-relationship between the difference in refractive index of the glass and the changes in reflectance.

When the refractive index profiles are compared, the refractive index profile in Example 1 is not dependent on the type of glass; however, in Comparative Examples 1 and 2, the change in refractive index of the plate crystal layer mainly composed of aluminum oxide differs significantly depending on the type of glass. This confirms that when the intermediate film is used, elution of the glass components during the hot water treatment can be prevented and the adverse effects caused by the components that have eluted during the course of forming the plate crystal layer are avoided.

In Example 2, it was confirmed that when cations are intercalated between the layers to form a smectite intercalation compound thin film, the refractive index of the intermediate layer can be controlled.

Since the optical member of the present invention has a high antireflection performance, the optical member can be used in imaging optical systems used in imaging lenses of cameras, projection optical systems used in projectors, and observation optical systems used in binoculars.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-244832, filed Oct. 23, 2009, which is hereby incorporated by reference herein in its entirety.

The invention claimed is:

1. An optical member comprising:
a glass substrate; and
an antireflection film disposed on a surface of the glass substrate,
the antireflection film including
an oxide layer mainly composed of aluminum oxide and having a textured shape in a surface, and
an intermediate layer disposed between the glass substrate and the oxide layer,
the intermediate layer including
a plurality of sheet-like crystals arranged in a direction of the surface of the glass substrate with a surface of the sheet-like crystals extending parallel to the surface of the glass substrate,
wherein the sheet-like crystals have a polygonal shape, a circular shape, or an elliptical shape, with a longest side of the surface of the sheet-like crystals being 10 nm or more and 500 nm or less, and having a thickness of 0.5 nm to 25 nm, wherein the plurality of sheet-like crystals are stacked so that a surface of at least one sheet-like crystal is positioned above an interface between two adjacent sheet-like crystals.

2. The optical member according to claim 1, wherein the sheet-like crystals contain one of layered phyllosilicate minerals, layered polysilicates, and layered double hydroxides.

3. The optical member according to claim 1, wherein the intermediate layer further includes at least one organic compound interposed between the layers.

4. The optical member according to claim 1, wherein the glass substrate contains at least one of $BaO$, $La_2O_3$, and $TiO_2$.

5. An optical system comprising the optical member according to claim 1.

6. A method for making an optical member including a glass substrate and an antireflection film on a surface of the glass substrate, the method comprising:

applying a liquid in which sheet-like crystals are dispersed onto a glass substrate and drying the applied liquid to form an intermediate layer; and forming a film mainly composed of aluminum oxide on the intermediate layer and immersing the film in hot water to form a textured shape in a surface, wherein the sheet-like crystals have a polygonal shape, a circular shape, or an elliptical shape, with a longest side of the surface of the sheet-like crystals being 10 nm or more and 500 nm or less, and having a thickness of 0.5 nm to 25 nm.

7. The method according to claim 6, wherein the sheet-like crystals contain one of layered phyllosilicate minerals, layered polysilicates, and layered double hydroxides.

* * * * *